US007024984B2

(12) United States Patent
Leung et al.

(10) Patent No.: US 7,024,984 B2
(45) Date of Patent: Apr. 11, 2006

(54) METHOD OF MAKING COFFEE AND COFFEE MAKER

(75) Inventors: Chi Wah Leung, Chaiwan (HK); Chi Chung Fung, Chaiwan (HK); Shek Chuen Luk, Chaiwan (HK)

(73) Assignee: Simatelex Manufactory Co., Ltd., Chaiwan (HK)

( * ) Notice: Subject to any disclaimer, the term of this patent is extended or adjusted under 35 U.S.C. 154(b) by 355 days.

(21) Appl. No.: 10/078,889

(22) Filed: Feb. 19, 2002

(65) Prior Publication Data

US 2003/0157227 A1    Aug. 21, 2003

(51) Int. Cl.
*A47J 31/00*    (2006.01)
(52) U.S. Cl. ............... 99/299; 99/320; 99/280
(58) Field of Classification Search .......... 99/299, 99/320, 280
See application file for complete search history.

(56) References Cited

U.S. PATENT DOCUMENTS

| | | | | |
|---|---|---|---|---|
| 2,592,761 A | * | 4/1952 | Svendsgaard ............... 99/283 |
| 3,261,280 A | * | 7/1966 | Kaplan et al. ............... 99/283 |
| 3,596,675 A | * | 8/1971 | Krueger et al. ............. 137/389 |
| 3,693,535 A | * | 9/1972 | Abel, Jr. ..................... 99/282 |
| 3,757,669 A | * | 9/1973 | Holstein et al. ............. 99/280 |
| 4,196,658 A | * | 4/1980 | Takagi et al. ............... 99/286 |
| 4,713,253 A | * | 12/1987 | Stone, Jr. .................... 426/433 |
| 4,796,521 A | * | 1/1989 | Grossi ......................... 99/287 |
| 5,064,980 A | * | 11/1991 | Grossman et al. .......... 219/689 |
| 5,699,718 A | * | 12/1997 | Yung et al. .................. 99/292 |
| 6,224,755 B1 | | 5/2001 | Schamberg et al. ......... 210/149 |
| 6,425,317 B1 | | 7/2002 | Simmons | |
| 6,481,339 B1 | * | 11/2002 | Castleberry ................. 99/305 |
| 6,789,461 B1 | * | 9/2004 | Huang et al. ................ 99/331 |

FOREIGN PATENT DOCUMENTS

WO    WO 99/49767    10/1999

OTHER PUBLICATIONS

Derwent Accession No. 2000-534476 (abstract for EP 1029485).
Derwent Accession No. 1985-020273 (abstract for EP 0131935).

* cited by examiner

*Primary Examiner*—Anthony Weier
(74) *Attorney, Agent, or Firm*—C. James Bushman; Browning Bushman P.C.

(57) ABSTRACT

A method of making coffee in a drip-type coffee maker includes adding heated water to a brew basket containing coffee grinds, allowing said water to accumulate within the brew basket, and at a predetermined moment opening an aperture in the brew basket to allow the water to drain. In a drip-type coffee maker the aperture in the brew basket has a closure. A controller is operable to move the aperture closure to the open position a predetermined moment after heated water is delivered to the brew basket. The predetermined moment may be when the water in the brew basket reaches a predetermined level, or a predetermined time after the coffee maker is activated.

6 Claims, 4 Drawing Sheets

METHOD OF MAKING COFFEE AND COFFEE MAKER

FIELD OF THE INVENTION

The invention relates to methods of making coffee and to coffee makers, and in particular to drip-type coffee makers.

BACKGROUND OF THE INVENTION

One method of making coffee includes passing heated water through coffee grinds in order to infuse the water with coffee flavour and aroma. A common type of coffee maker that employs this method is the so-called "drip-type" coffee maker. In order to make good coffee the water should evenly wet the grinds.

Drip-type coffee makers comprise a water reservoir and a brew basket for receiving coffee grinds. A delivery tube or other water passage takes water from the water reservoir, through an in-line water heater, and delivers it to a spreader above coffee grinds in the brew basket. The heated water passes through the coffee grinds and in to a carafe, cup or other vessel.

A problem with drip-type coffee makers is uneven wetting and extraction of the coffee grinds. The spreader attempts to distribute the heated water evenly over the coffee grinds however, the heated water generally flows through the centre portion of the brew basket. There is typically less wetting of the coffee grinds at the outer edges of the brew basket. This results in uneven extraction of the coffee grinds and has an adverse affect on the quality of the coffee beverage.

SUMMARY OF THE INVENTION

It is an object of the present invention to overcome or ameliorate the above disadvantage, or at least to provide the public with a useful alternative.

According to a first aspect of the invention there is provided a method of making coffee in a drip-type coffee maker including adding heated water to a brew basket containing coffee grinds, allowing said water to accumulate within the brew basket, and at a predetermined moment opening an aperture in the brew basket to allow the water to drain.

According to a second aspect of the invention there is provided a method of making coffee in a drip-type coffee maker including adding heated water to a brew basket containing coffee grinds, allowing said water to accumulate to a predetermined level within the brew basket, and when said predetermined level is reached opening an aperture in the brew basket to allow the water to drain.

According to a third aspect of the invention there is provided a coffee maker including:
 a water reservoir,
 an in-line water heater,
 a brew basket for receiving coffee grinds, the brew basket having a aperture with a closure controllable between open and closed positions,
 a water passage between the reservoir and the brew basket, the passage passing through the in-line water heater for delivering heated water to the brew basket, and
 a controller operable to move the aperture closure to the open position a predetermined moment after heated water is delivered to the brew basket.

Preferably, the predetermined moment is when the water level in the brew basket reaches a predetermined level.

Preferably, the predetermined moment is a predetermined time after the coffee maker is activated.

Preferably, the controller is a buoyant body associated with the aperture closure and operable to move the closure to the open position when the water level reaches a predetermined level.

Preferably, the buoyant body engages with a holding means when the water level reaches the predetermined level.

According to a forth aspect of the invention there is provided a coffee maker including:
 a water reservoir,
 an in-line water heater,
 a brew basket for receiving coffee grinds,
 an aperture for draining water from the brew basket, the aperture having a closure,
 a water passage between the reservoir and the brew basket, the passage passing through the in-line water heater for delivering heated water to the brew basket, and
 a buoyant controller including a first buoyant body member and a second body member bearing the aperture closure, the body members being slidably engaged between first and second positions, the buoyant controller being operable to move the closure between a closed position and an open position when the water level in the brew basket reaches a predetermined level.

Preferably, the first buoyant member engages with a holding means when the water level reaches the predetermined level.

Preferably, the coffee maker further includes a lid, the buoyant member magnetically engaging the lid when the water level reaches the predetermined level.

Further aspects of the invention will become apparent from the following description which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

The invention provides for making coffee in a drip-type coffee maker by adding heated water to a brew basket containing coffee grinds and allowing the water to accumulate in brew basket. The water is allowed to sit in the brew basket for a predetermined period to evenly wet and extract the coffee grinds. After the predetermined period an aperture at the bottom of the brew basket is opened so that the infused water can drain into a coffee carafe, cup or other vessel.

In the preferred embodiment the aperture in the bottom of the brew basket is close by a closure, such as a plug, controlled by a buoyant body. When the water level in the brew basket rises to a predetermined level the buoyant body lifts the closure allowing the water to drain through the aperture. Heated water must accumulate in the brew basket before the aperture is opened. Sufficient time is provided for the water to fully wet the coffee grinds and become infuse with coffee favour and aroma.

Figure 1:
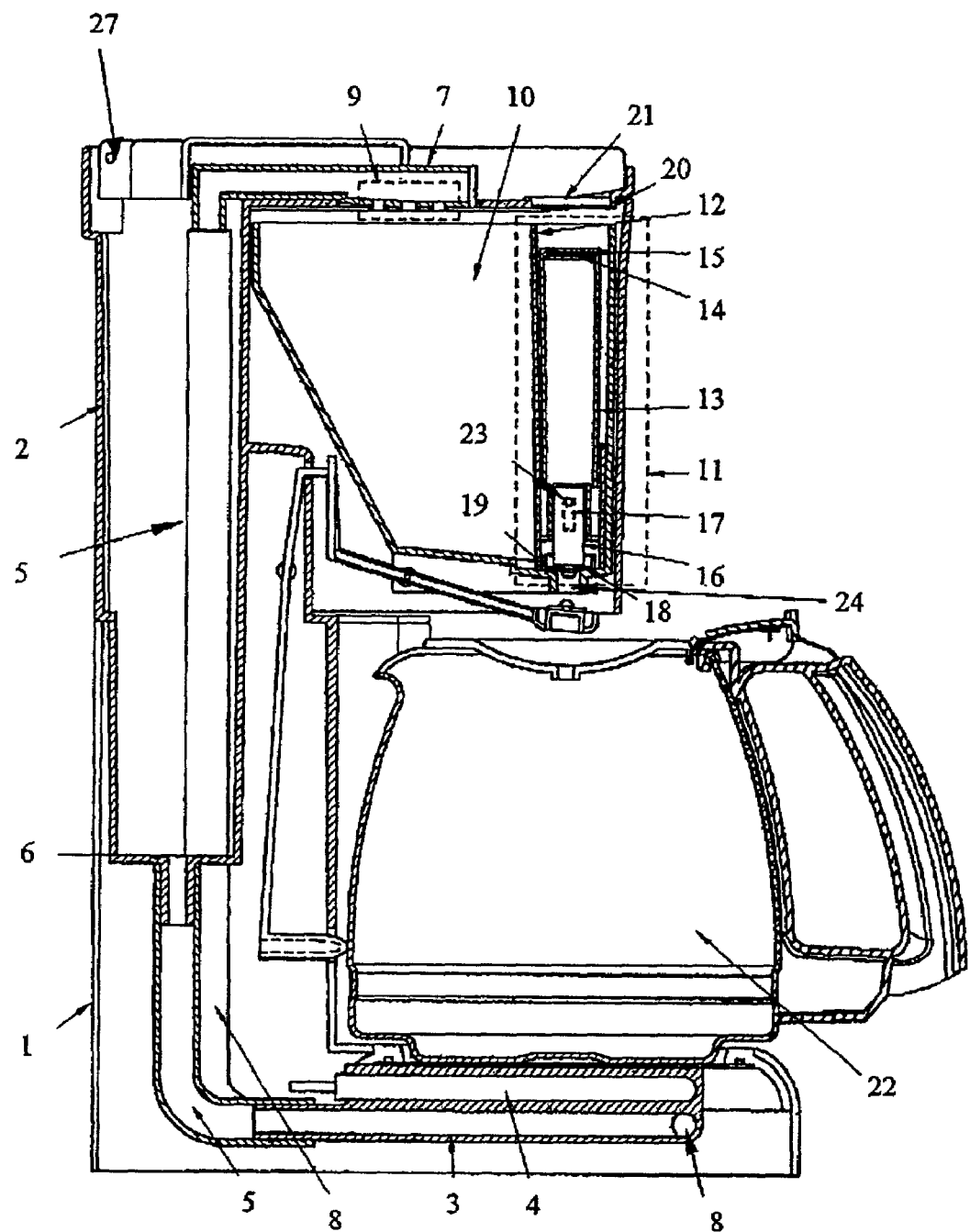
FIG. 1 illustrates a sectional view through a drip-type coffee maker according to the invention.

Referring to FIG. 1, a drip-type coffee maker 1, for use in the invention, includes a water reservoir 2 for storage of water to be heated. The reservoir 2 has a water outlet 6 at its bottom end.

An in-line water heater 3 doubles as a hot plate 4 for coffee carafe 22. The in-line water heater has a heating passage 8 through it for receiving a water passage 5 from the water outlet 6.

The water passage 5 passes through the in-line heater 3 and up to a spreader 7 having apertures 9 located above a brew basket 10. Spreader 7 distributes heated water over coffee grinds (not shown) in the brew basket 10. The brew basket 10 is in fluid communication with an aperture 19 for draining infused water from the brew basket 10 into the coffee carafe 22.

Figure 2:
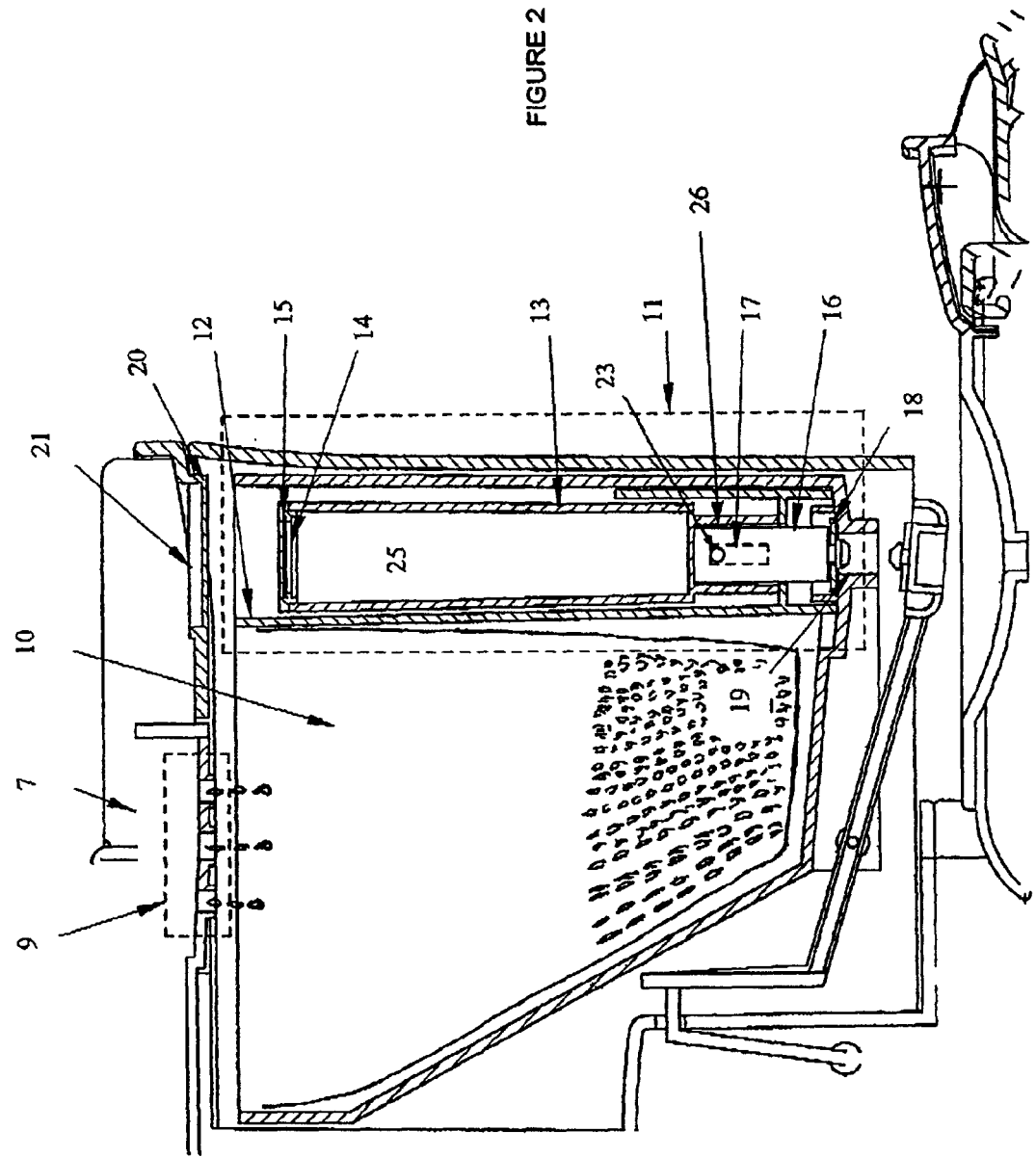
FIG. 2 illustrates a detailed view of the brew basket prior to delivery of heated water.
Figure 3:
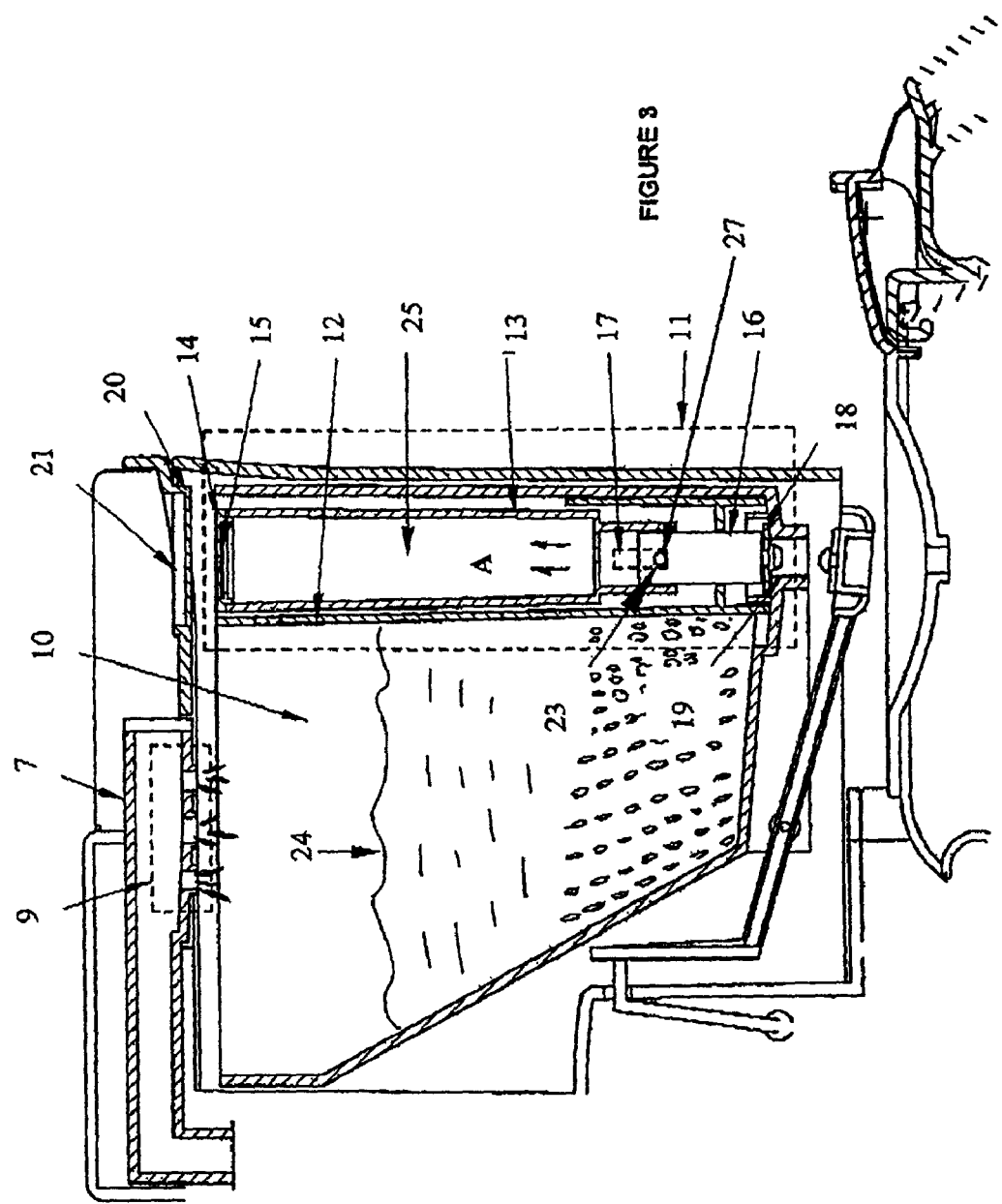
FIG. 3 illustrates a detailed view of the brew basket when half full of water.
Figure 4:
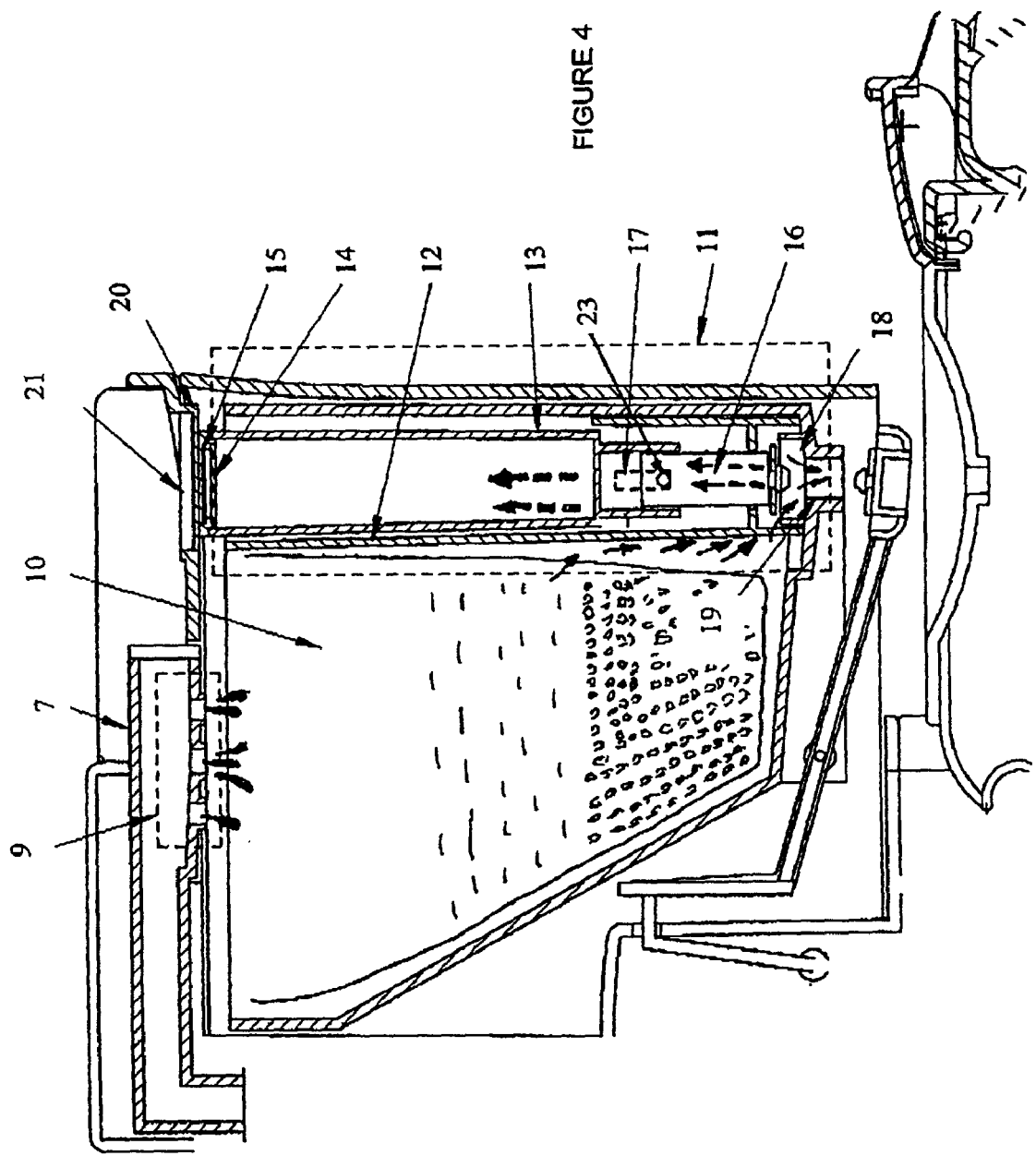
FIG. 4 illustrates a detailed view of the brew basket after draining of the water.

Referring to FIG. 2, dispose above aperture 19 is a support frame 12 that slidably receives a buoyant controller 25. The buoyant controller 25 includes an upper buoyant body member 13 that is alidably engaged with a lower body member 16. At its lower end, buoyant body 13 has a downwardly extending skirt 26 into which lower body member 16 is slidably received. The buoyant body member 13 and lower body member 16 are slidably engaged by a pin 23 and slot 17 arrangement so as to be moveable relative to each other from a first position (as shown in FIG. 2) to a second position (as shown in FIGS. 3 and 4).

The lower end of lower body member 16 bears a closure for aperture 19 in the form of washer 18. The buoyant control 25 is slidably disposed within frame 12 so as be vertically buoyantly displaceable as the water level in brew basket 10 changes.

The coffee maker 1 has a lid 20 for covering the brew basket 10 and spreader 7. The lid 20 is engaged at a hinge 27, and can lifted to allow removal and/or cleaning of the brew basket and/or filter. In normal use, the lid 20 is in place to retain heat within the brew basket 10 and to stop contaminates entering the brew basket and water splashing out of the brew basket, Immediately above frame 12 lid 20 bears a magnet 21. The top end 14 of buoyant controller 25 has a metal disk 15 so that it can be magnetically received and held against magnet 21 on lid 20.

Prior to use, with no water in the brew basket, buoyant housing 13 and lower housing 16 of buoyant controller 25 are in their first position, and are resting at the bottom of frame 12 so that washer 18 closes aperture 19.

When the coffee maker 1 activated heated water is delivered the brew basket through spreader apertures 9 in known manner. The water is retained within the brew basket because aperture 19 is close by washer 18.

Referring to FIG. 3, as the water level 24 within the brew basket 10 rises buoyant body member 13 of controller 25 id buoyantly displaced upwards in the direction of arrow A. Lower body member 16, which has a relative density greater than water, remains in its initial position with washer 18 closing aperture 9. Buoyant body member 13 can be slidably displace upwards by operation of slot 17 and pin 23 arrangement until buoyant body member 13 and lower body member 16 are in their second relative position. When buoyant body member 13 and lower body member 16 are in their second relative position the brew basket will be full to substantially its desired level. Buoyant body 13 cannot be upwardly displaced further without lifting lower body member 16 because pin 23 bears against end 27 of slot 17. In addition, at this stage metal disk 15 is within the magnetic influences of magnet 21.

Referring to FIG. 4, any further increase in water level 24 will cause lower body member 16 to be displace upwardly lifting washer 18 from aperture 19. Also, and importantly, metal disk 15 will come within the influence of magnet 21 and buoyant controller 25 will be magnetically displaced upwards so that metal strip 15 is received against magnet 21 and held there. Washer 18 is now fully clear of aperture 19 and the infused water in brew basket 10 can drain through aperture 19 into coffee carafe 22. As the water level recedes buoyant controller 25 is held against lid 20 by magnet 21 keeping the aperture 19 open.

By the invention, heated water is retained within the brew basket to fully wet and extract the coffee grinds. When the water level within the brew basket reaches a predetermined level the aperture is opened to allow the infused water to drain into the coffee carafe.

After a brewing cycle lid 21 will be lifted so that the brew basket can be cleaned and fresh coffee grinds place therein. When this is done the magnetic coupling between magnet 21 and metal disk 15 is broken and buoyant controller 25 returns to its lower position to close aperture 19 for the next brew cycle.

In an alternative embodiment the buoyant controller 25 is an electrically activated solenoid having an aperture closure 18 at the bottom portion thereof. By electrical activation of the solenoid the closure 18 is lifted from aperture 19 allowing heated water to drain from coffee carafe 22. A simple electronic timer circuit is employed to create a predetermined time delay between activation of the coffee maker 1 and opening of aperture 19. In another alternative embodiment an electric/electronic water level sensor or flow switch of known type causes an electronic activation signal at a predetermined water level for energising the solenoid and opening aperture 19. Such alternative embodiments are within the ability of a skill addressee.

Where in the foregoing description reference has been made to integers or elements have known equivalents then such are included as if individually set forth.

Embodiments of the invention have been described, however it is understood that variations, improvement or modifications can take place without departure from the spirit of the invention or scope of the appended claims.

What we claim is:

1. A coffee maker including:
   a water reservoir,
   an in-line water heater,
   a brew basket for receiving coffee grinds, the brew basket having a aperture with a closure controllable between open and closed positions,
   a water passage between the reservoir and the brew basket, the passage passing through the in-line water heater for delivering heated water to the brew basket, and
   a controller for moving the closure to the open position when the level of water in the brew basket rises to a level sufficient to fully wet coffee grinds in the brew basket.

2. A coffee maker as claimed in claim 1 wherein the controller is a buoyant body associated with the closure and operable to move the closure to the open position when the later level reaches a predetermined level.

3. A coffee maker as claimed in claim 2 wherein the buoyant body engages with a holding means when the water level reaches the predetermined level.

4. A coffee maker including:
a water reservoir,
an in-line water heater,
a brew basket for receiving coffee grinds,
an aperture for draining water from the brew basket, the aperture having a closure,
a water passage between the reservoir and the brew basket, the passage passing through the in-line water heater for delivering heated water to the brew basket, and
a buoyant controller including a first buoyant body member and a second body member bearing the aperture closure, the body members being slidably engaged between first and second positions, the buoyant controller being operable to move the closure between a closed position and an open position when the water level in the brew basket reaches a predetermined level.

5. A coffee maker as claimed in claim 4 wherein the first buoyant member engages with a holding means when the water level reaches the predetermined level.

6. A coffee maker as claimed in claim 4 further including a lid, the buoyant member magnetically engaging the lid when the water level reaches the predetermined level.

\* \* \* \* \*